United States Patent [19]

Deutsch et al.

[11] 4,269,101
[45] May 26, 1981

[54] APPARATUS FOR GENERATING THE COMPLEMENT OF A FLOATING POINT BINARY NUMBER

[75] Inventors: Ralph Deutsch; Leslie J. Deutsch, both of Sherman Oaks, Calif.

[73] Assignee: Kawai Musical Instrument Mfg. Co., Ltd, Hamamatsu, Japan

[21] Appl. No.: 103,896

[22] Filed: Dec. 17, 1979

[51] Int. Cl.³ .......................... G06F 7/52; G10H 5/00
[52] U.S. Cl. ..................................... 84/1.01; 84/1.03; 364/757
[58] Field of Search ..................... 84/1.01, 1.03, 1.24; 364/757

[56] References Cited

U.S. PATENT DOCUMENTS

| | | | |
|---|---|---|---|
| 4,022,098 | 5/1977 | Deutsch et al. | 84/1.03 |
| 4,031,377 | 6/1977 | Deutsch et al. | 364/757 |
| 4,085,644 | 4/1978 | Deutsch et al. | 84/1.01 |
| 4,144,789 | 3/1979 | Deutsch | 84/1.24 |

Primary Examiner—Stanley J. Witkowski
Attorney, Agent, or Firm—Ralph Deutsch

[57] ABSTRACT

A complementer for floating point binary numbers utilizes two digital logic decision rules selected by the value of the power of the input number. The first decision rule is selected for an input power of −1 and constructs a power and mantissa determined by the binary sequence form of the input mantissa. The second decision rule is selected for input powers less than −1 and constructs a mantissa determined by the binary sequence form of the input mantissa and the value of the power. The complemented power is set to a −1 value. The complementer is advantageously employed in digital electronic musical instruments.

8 Claims, 2 Drawing Figures

APPARATUS FOR GENERATING THE COMPLEMENT OF A FLOATING POINT BINARY NUMBER

BACKGROUND OF THE INVENTION

1. Field of the Invention

This invention relates broadly in the field of binary digital logical circuitry and in particular is concerned with an envelope generator for an electronic musical instrument.

2. Description of the Prior Art

It is well known that the ordinary complement of a number represented digitally as a binary number is obtained by forming a new binary sequence of digits in which for any bit position j, the new values are $1-n_j$ where $n_j$ is the corresponding value of the original binary number for the same bit position j. If the original binary number is represented by N binary digits, then the decimal numerical value corresponding to the complement is $(2^N-1)$ minus the decimal value of the original binary number before forming the complement.

In the usage of binary number terminology, the ordinary complement is sometimes simply called the "complement." The ordinary complement is also called the 1's complement to differentiate it from the operation known as the 2's complement. For binary digital numbers, the 2's complement is obtained by first forming the complement and then adding a "1" to the least significant bit while permitting a carry bit as required in turn to all the more significant bit positions in sequence.

The implementation of a 1's complementor circuitry for an ordinary, or fixed point, binary number consists of a simple state inversion operator which is easily implemented with digital logic gate invertors.

By analogy with the common representation of a decimal number as a floating point number, the same decimal number can also be represented in the form of a floating point binary number. The binary floating point number representation of a decimal number having the value A is defined by an expression of the form $$A = (1 + a_1 2^{-1} + a_2 2^{-2} a_3 2^{-3} + \ldots + a_k 2^{-k}) \times 2^J, \quad \text{(Eq. 1)}$$

where the coefficients $a_j$ have either a value of 0 or 1.

The conventional method of forming the 1's complement for a number A represented as a binary floating point number in the form shown in Eq. 1 consists of implementing the following three operation steps:

(1) convert the given binary floating point number to its equivalent fixed point binary number, (2) construct the 1's complement of the equivalent fixed point binary number, (3) convert the resulting 1's complemented number to a binary floating point number.

Each of the preceding steps can readily be implemented using known state of the art digital logic circuits. One disadvantage to using the conventional method of forming the complement of a binary floating number lies in the required comparatively large number of digital logic gates used to implement the three operation steps.

The present invention provides a novel means for implementing digital circuitry for directly performing the complement of a binary floating point number without performing the preceding three steps of the conventional method.

An example of the application of the present invention is to the envelope function generator for an electronic musical instrument as described in U.S. Pat. No. 4,144,789 entitled "Amplitude Generator For An Electronic Organ." The envelope function generator described in the referenced patent creates an exponentially decreasing set of data points suitable for the release envelope modulation function for a musical tone. The envelope modulation function for the attack phase of the tone production is obtained by computing a set of points as a fixed constant minus the data value for the corresponding decay point. The described envelope generator creates the envelope data points in the form of floating point binary numbers. The present invention can be advantageously incorporated into the musical tone envelope generator to provide an efficient and economical means for obtaining the attack phase envelope points by furnishing the complements of the generated decay values represented as binary floating point numbers.

SUMMARY OF THE INVENTION

The present invention is directed to a novel method of generating the complement of a binary floating point number. It can be utilized in a digital ADSR generator for a digital organ of the type described in U.S. Pat. No. 4,144,789 entitled "Amplitude Generator For An Electronic Organ."

The ADSR of the referenced patent utilizes the logorithmic character of binary floating point numbers to approximate exponential curves. It is known that any number can be written approximately as a binary floating point number in the form $1.b_1 b_2 b_3 \times 2^j$ where $b_1, b_2, b_3$ may have either of the two binary values 0 or 1 and j is an integer. By storing the binary digits $b_1$, $b_2$ and $b_3$ in a counter and storing j expressed in binary form in a counter, then counting down the first counter and counting down the second counter each time the first counter goes through 0, a series of numbers can be generated which approximate a decreasing exponential function. If the same floating point binary numbers are complemented then a series of numbers is generated which approximate an increasing exponential function.

In brief the complement of a binary floating point number having a power less than or equal to $-1$ is accomplished by implementing digital logical circuitry. Two logic branches are incorporated depending upon whether the power j is equal to or less than $-1$. The complement is then formed in each branch depending upon the position of the zero bit positions in the mantissa of the input floating point number.

It is an objective of the present invention to obtain directly the complement of a binary floating point number without implementing intermediate steps of conversion to a fixed point binary number.

BRIEF DESCRIPTION OF THE DRAWINGS

For a better understanding of the invention reference should be made to the accompanying drawings.

DETAILED DESCRIPTION OF THE INVENTION

Figure 1:
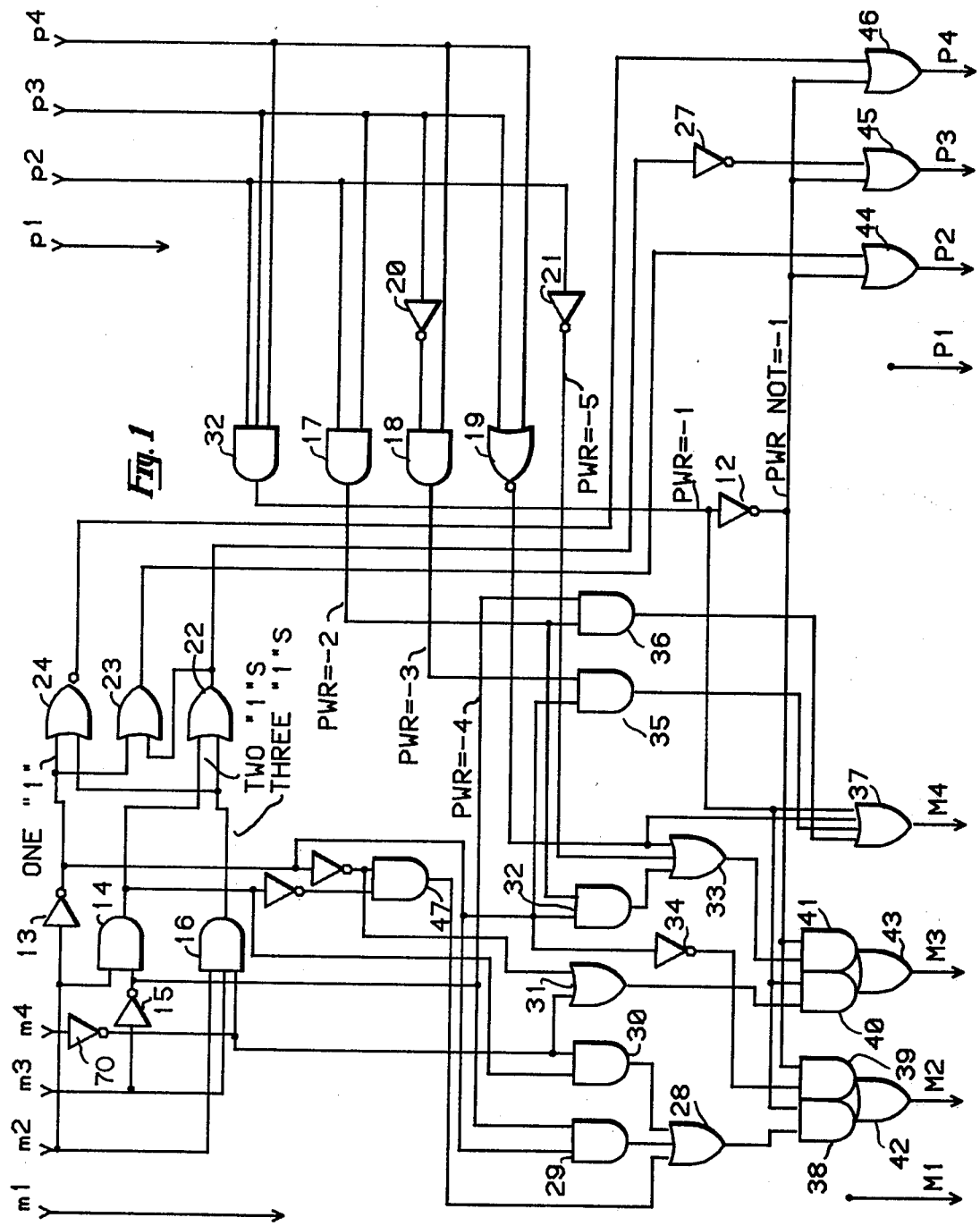
FIG. 1 is a schematic logic diagram of an embodiment of the invention.

The present invention is directed toward a means for forming the complement of a binary floating number. This means can be utilized in a variety of digital systems employing binary representations of numerical values. Such a system is described in detail in U.S. Pat. No. 4,144,789 entitled "Amplitude Generator For An Electronic Organ" which is hereby incorporated by reference.

By analogy with the conventional representation of decimal numbers as floating point numbers, a decimal number can also be represented in the form of a floating point binary number. A binary floating point number representation of a number A is a number having the form:

$$A = (1 + b_1 2^{-1} + b_2 2^{-1} + b_3 2^{-3} + \ldots + b_k 2^{-k}) \times 2^j \quad \text{(Eq.2)}$$

where the coefficients $b_i$ have either a value of 0 or 1. For many applications, sufficient numerical accuracy is attained by limiting the representation shown in Eq. 2 to a length of $k=3$. In the following, the floating point numberers are restricted to the case $k=3$ and consequently can be written in the form $$A = 1 \cdot b_1 b_2 b_3 \times 2^j \quad \text{(Eq. 3)}.$$

The number $1 \cdot b_1 b_2 b_3$ is called the mantissa of the floating point binary number and the number j is called its power. The advantage of using floating point binary numbers is that a very large numerical range can be accomodated in a digital numerical system with only a few fits. The mantissa only requires 3 bits for all numbers and the maximum and minimum numerical range is solely determined by the number of bits used to represent the power j. The power j is usually represented as a fixed point binary number. The power j is used in the 2's complement form so that both positive and negative values of the power j can be represented in a convenient binary fashion. This 2's complement form is particularly convenient to use when two floating point binary numbers are multiplied since in this situation the resulting floating point binary number has a power which is the algebraic sum of the individual powers of the multiplier and multiplicand.

The complement of a binary floating point number in the form of Eq. 3 has the numerical value 0.9961-A, where A is the numerical value of the binary floating point number. If A is a very small number it is obvious that 0.9961-A will simply be equal to 1. In any arithmetical operation involving the addition or substraction of binary floating numbers it is mandatory that the individual powers of the two numbers be used before the addition or substraction is performed. Since complementation is equivalent to a substraction, the power of the number j will influence the implementation of the complementing logic.

A simple mathematical algorithm is not known for directly performing the complement of a binary floating point number. The correct direct mathematical procedure is: (i) convert the binary floating point number to a fixed point binary number, (ii) complement the fixed point binary number, and (iii) convert the the complemented number to the binary floating point form.

FIG. 1 illustrates the digital logic used to implement the complement of binary floating point numbers having the form expressed in Eq. 3 and having a power j less than or equal to $-1$. The logic is a heuristic algorithm which was obtained by numerically experimenting with the digital bit forms of binary floating point numbers and their complements. The illustrated digital logic is a means for implementing the following decisions:

Rule 1: If the input binary floating point numbers has a numerical power $j = -1$, then the complement number will have a power equal to the negative of one more than the number of consecutive bits having a "1" value in the input mantissa. The output mantissa is constructed by first locating the first zero (if any exists) in the input mantissa. The mantissa is then complemented starting at the position of the first zero and continuing from this point to the end of the original mantissa. Bit values of "1" are appended to this construction to complete the four bit values required to express the mantissa.

Rule 2: If the input binary floating point number has a numerical power $j < -1$, the output power is set equal to $-1$. The output mantissa is constructed by starting with a number of "1" bits equal to one less than the negative value of the input power j. The original mantissa is then complemented as if it were a fixed point number and the resultant complemented bits are appended to the original set of "1" bits until the required four bits for the output mantissa has been formed.

The following two cases will illustrate the application of the preceding heuristic method of forming the complement of a binary floating point number.

Case a: The input decimal value is $A = 0.6875$. Expressed as a binary floating point number A:1.011 1111. The first four bits with the radix point denote the mantissa while the last four bits denote the power $j = -1$ expressed in 2's complement form. Since the power $j = -1$, the decision rule 1 is applied. Since there are only 1 consecutive "1" bits in the input mantissa, the complement power is given the value $j = -2$. The first zero occurs in the second bit position of the mantissa, therefore the mantissa of the complement starts with the construction 1.00. The last step is to add a "1" to complete the four bits required for the output mantissa. The net result is that the complement is constructed to be: 1.001 1110. This corresponds to the decimal number $A' = 0.28125$. But since $0.9961 - A = 0.3086$, $A'$ is equal to the desired complement with an error of 9%.

Case b: The input decimal value is $A = 0.2031$. Expressed as a binary floating point mumber A: 1.101 1101. Since the input power is $j = -3$, rule 2 is applied to construct the complement in binary floating point form. The decision rule 2 states that in case b the complement will have a power $j = -1$. Moreover because the input power of A is $-3$, the complement mantissa will start with 2 bit positions having the values "1." Thus the mantissa of the complement starts with the construction 1.1. The next step is to complement the original mantissa to form 0010. This form is added to the construction 1.1 and four bits are retained for the mantissa of the complement. The net result is that the complement is constructed to be: 1.100 1101. This corresponds to the decimal number $A' = 0.75$. But since $0.9961 - A = 0.7930$, $A'$ is equal to the desired complement with an error of 5.4%.

The two rules for forming the complement were evaluated for the decimal numbers in the range of 0.9375 to 0.0313. It was found that the error in the complement ranged from a minimum of 0.4% to a maximum of 11%. The error is primarily caused by the restriction of limiting the mantissa of the binary floating point numbers to four bits. Four bits do not permit the complements to be expressed in some cases with greater accuracy than between the ranges of 0.4% and 11%.

It is a characteristic of numerical computing and control systems using floating point numbers, either decimal or binary, that numerical accuracy is sacrificed to obtain a large numerical range of values. Thus the errors in the complement are not a restrictive limitation of the present invention but are representative of the errors encountered with expressing numbers in floating point form.

Refer now to FIG. 1. The input mantissa is denoted by m1, m2, m3, m4, in the assumed form with radix point as m1.m2 m3 m4. The input power is denoted in 2's complement binary form as p1 p2 p3 p4 with p1 representing the most significant bit. The output mantissa is denoted by M1.M2 M3 M4 and the output power is denoted by P1 P2 P3 P4 with P1 representing the most significant bit.

AND gate 32 will have a "1" state output if p2, p3, and p4 are all in the "1" state. Thus a "1" output from AND gate 32 is the result for an input number having a power equal to $-1$. The label "PWR$=-1$" in FIG. 1 indicates a line that will be in the "1" state for an input power equal to the decimal value $-1$.

A "1" signal at the output of the invertor 12 indicates that the power of the input binary floating point number is not equal to the decimal value $-1$. If the output of the invertor 12 is a "1," then the output power bits are all set to the "1" logic state. This logic circuitry thereby implements the preceding decision rule 2 for input powers that are less than the decimal value $-1$.

The lines M1 and P1 will always be in a "1" state and are placed in this state by simply connecting the lines to a constant voltage source. m1 will always be a "1" and therefore m1 does not have to be considered in the decision logic illustrated in FIG. 1. For the range of input decimal values 0.9375 to 0.0313, p1 will always be a "1" and therefore p1 does not have to be considered explicitly in the logic shown in FIG. 1.

The output of invertor 13 will be a "1" state if the input mantissa bit m2=0. Thus a "1" output from invertor 13 indicates that there are only one consecutive "1" bit states in the input mantissa. The line label 'one"1"-'denotes that a signal on this line indicates one consecutive "1" bit states for the input mantissa.

The output of AND gate 14 will be a "1" state if m2=1 and m3=0. Thus a "1" state output from AND gate 14 indicates that there are two consecutive "1" bit states for the input mantissa.

The output of AND gate 16 will be a "1" state if m2=1, m=1, and m4=0. A "1" for m4 is converted to a "0" state by means of the invertor 70. Thus a "1" state output from AND gate 16 indicates that there are three consecutive "1" bit states for the input mantissa.

The combination consisting of the logic gates 17 through 21 acts as a decoder to obtain separate signal lines for input power values lying within the range $-2$ to $-5$.

The output state of AND gate 17 will be "1" if p1=1, p2=1, and p3=1. The value of p4 is of no consequence because if p1=1, p2=1, p3=1, and p4=1 then AND gate 11 detects a power value $-1$ which then dominates the power select logic. If p1=1, p2=1, p3=1, and p4=0, then the output from AND gate 11 is "0" while the output from AND gate 17 is "1" indicating that the input power has the decimal value $-2$.

The output of AND gate 18 has the state "1" if p1=1, p3=0, and p4=1. The output "1" state indicates an input power having the decimal value $-3$. The input state of p2 does not have to be considered at AND gate 18 because the logic system shown in FIG. 1 is an illustration of the invention for the case in which the input powers are not less than the decimal value of $-6$.

The output state of NOR gate 19 is "1" if p1=1, p3=0, and p4=0. This output "1" state corresponds to an input power having the decimal value $-4$.

The output state of the invertor gate 21 is "1" if p2=0. An examination of the 2's complement representation for the decimal numbers $-1$ to $-5$ expressed as four binary bits shows only the decimal value of $-5$ leads to a value p2=0.

Three examples are described below in detail to illustrate the operation of the complementing system shown in FIG. 1.

EXAMPLE 1:

The input number A=0.9375 is represented as a binary floating point number in the form 1.111 1111. Since p2=p3=p4=1, the output state from the invertor 12 will be "0." Therefore the output power bits P2, P3, P4 will be determined by the action of the logic gates 22, 23, 24, and 27. This set of logic gates implement decision rule 1.

Because m2=m3=m4=1 the output states of both AND gate 14 and AND gate 16 are both "0". Thus the output state from OR gate 22 is "0." Because of the action of the invertor 27, P3 will be "1" while P2=0. Since the two input signals to NOR gate 24 are both in the "0" state, the result is P4=1. The net result is that the output power bits are P1=1,P2=0,P3=1, and P4=1 which corresponds to the decimal value $-5$. This result is in agreement with decision rule 1 for the case in which the input binary floating point number has a power equal to the decimal value $-1$.

The next step is to examine how each bit is generated for the output complemented mantissa M2,M3, and M4. Both input signal lines to AND gate 47 are in the "1" state so that a "1" state is transferred to the output M2 via OR gate 28 and AND gate 38. The second input to the AND gate 38 is a "1" because the input power has a power equal to the decimal value $-1$.

Because the input states to AND gate 47 are both "1," a "1" state is transferred to M3 via OR gate 31 and AND gate 40. The second input signal to AND gate 40 is in the "1" state because AND gate 11 generates a "1" state for the given input power of decimal value $-1$.

M4 has the state "1" as transferred via OR gate 37 from the output state of AND gate 11.

The net result is that the output mantissa values are M1=M2=M3=M4=1 which agrees with decision rule 1.

EXAMPLE 2

The input number A=0.5625 is represented as a binary floating point number in the form 1.001 1111. Because the input power has the decimal value $-1$, the system logic will implement decision rule 1.

The output state of invertor 13 is "1" because in this example m2=0. This "1" state is transferred to P2 via OR gate 23 and OR gate 44.

Both input states to OR gate 22 are "0," therefore a "1" state is created by invertor 27 and transferred to P3 via OR gate 45.

One input state to NOR gate 24 is "1" because m2=0. The other input to this gate is a state "0." Thus the output state from NOR gate 24 is "0." The net result is P4=0.

The output power bits are P1=1, P2=1, P3=1, and P4=0. These bits designate the decimal value −2 which agrees with decision rule 1.

The next step is to examine the operation of the logic which generates the mantissa for this example.

Since m2=0, the output state from invertor 13 is "1" which is transferred as one input signal state to the AND gate 29. The output state of invertor 15 is "1" because m3=0. Therefore the second signal line to the AND gate 29 is in the "1" state and a "1" is transferred via AND gate 29 in combination with OR gate 28 and OR gate 38. The state of PWR=1 line from AND gate 11 is a "1" which causes AND gate 38 to transfer a "1" to M2.

One input to the OR gate 31 is a "0" state because m4=1. The output state of invertor 13 is "1" because m2=0. this "1" state is inverted to a "0" state and transferred as the second input to the OR gate 31. Thus a "0" state is transferred via OR gate 31 and AND gate 40 to make M3=0.

The output state "1" from AND gate 11 is transferred via OR gate 37 to make M4=0.

The net result is the output mantissa values M1=M2=1, M3=0, and M4=0, which agrees with decision rule 1.

EXAMPLE 3

The input number A=0.2031 is represented as a binary floating point number in the form 1.101 1101. The input power is the decimal value −3 and the logic system shown in FIG. 1 will implement decision rule 2.

Because the input power is less than the decimal value −1, invertor gate 12 causes all the output power bits to be in the "1" state. Thus in this example it is only necessary to examine the logic that generates the complemented output mantissa.

Since m2=1, a "1" state is transferred to one input of AND gate 39 because of the combined action of invertors 13 and 34. This state generates the output M2=1.

Because the input power has the decimal value −3, the PWR=−4 and PWR−5 signal lines will both be in the "0" state. Moreover, because the line PWR=−2 is also in the "0" state, the output state of AND gate 32 is "0." This AND gate 41 transfers a "0" state to make M3=0.

Both AND gate 35 and AND gate 36 have a "0" input state so that they each transfer a "0" state to the input lines of OR gate 37. The other two input lines to OR gate 37 are also in the "0" state so that the result is to generate M4=0.

The overall result is that the output mantissa has the values M1=1, M2=1, M3=0, and M4=0. This result agrees with decision rule 2.

The logic shown in FIG. 1 can readily be extended to include other powers for the input binary floating point number. Little or nothing is gained by extending the logic for larger negative powers because the result of the complement operation 0.9961-A produces a numerical result that either does not change or changes only slightly for small decimal values of the number A.

The logic can also be extended to include more bits in the mantissa if greater numerical accuracy is required.

Figure 2:
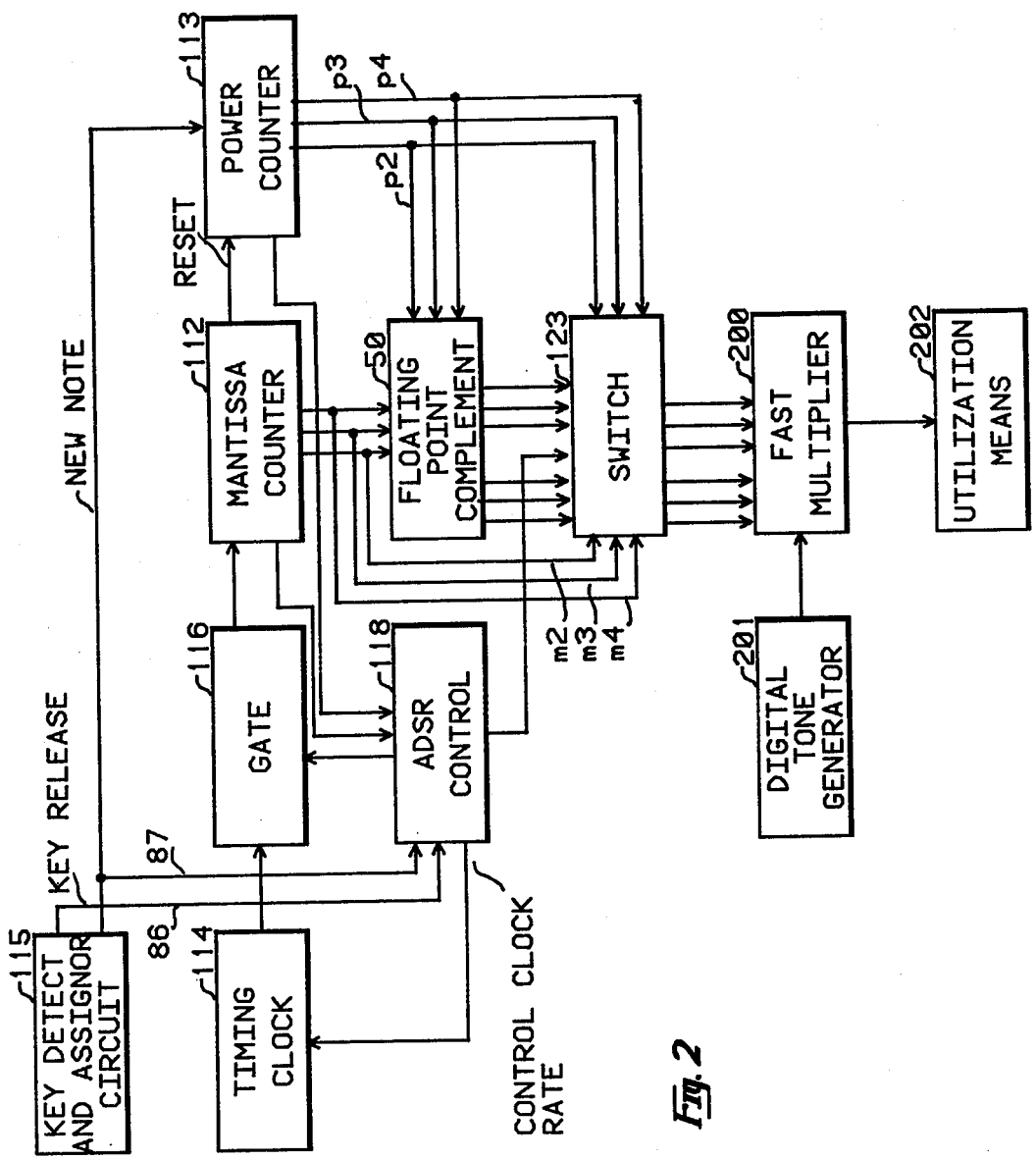
FIG. 2 is a schematic logic diagram illustrating the application of invention in a tone envelope modulation system.

The inventive complementor is advantageously employed as the complement circuit disclosed in the previously referenced U.S. Pat. No. 4,144,789. FIG. 2 shows the combination of the inventive complementor with the amplitude generator of the above referenced patent. The logic block numbers in the one hundred number series correspond to the same block numbers in FIG. 1 of the referenced patent having a number 100 less than those in the present FIG. 2. The complementor shown in detail in FIG. 1 of the present invention is indicated by logic block 50 in FIG. 2.

The attack and release curve data generator includes a first binary counter 112, the mantissa counter which preferably has three binary stages and counts modulo 8. The mantissa counter 113, is counted down by clock pulses from a timing clock 114. A second binary counter the power counter 113, also has three binary stages. The power counter 113 is counted down by underflow pulses from the highest order state of the mantissa counter 112. The three stages of the mantissa counter 112 store the mantissa and the three stages of the power counter store the power of a floating point number. As described previously the first, or most significant bits, of the mantissa and power are always a "1" and can be implemented by hardwiring a signal lead to a voltage source. The mantissa counter 112 is counted down in response to clock pulses from the timing clock 114 transferred via gate 116.

When a key is actuated on the keyboard of an associated electronic musical instrument, a signal on line 87 from a key detect and assignor circuit 115, described in detail in U.S. Pat. No. 4,022,098, entitled "Keyboard Switch Detect And Assignor Circuit," and hereby incorporated by reference, indicates that a new note is being generated by the tone generator. This sets the mantissa counter to binary 1's in all three stages while the power counter 113 is set to binary 1 in the highest order stage and to binary 0 in the other two stages. The new note signal is also applied to the ADSR control 118 which causes gate 116 to transfer timing clock pulses to the mantissa counter 112.

The ADSR control 118 in response to a new note signal opens the gate 116 and at the same time sets switch 123 so that binary floating point data from the binary floating point complement 50 is transferred to the fast multiplier 200. When the power counter 113 counts down to zero, the zero state is sensed by the ADSR control 118. In response to the sensing of this zero count state, the ADSR control 118 causes the switch 123 to transfer the contents of the mantissa counter 112 and power counter 113 to the fast multiplier 200 thereby initiating the decay portion of the ADSR curve calculation.

The ADSR control 118 senses when the power counter 113 counts down 1 after the start of the decay calculation. At this point it closes the gate 116 preventing further countdown of the mantissa counter 112 and the power counter 113 until the ADSR control 118 senses the key release signal on line 86 from the key detect and assignor circuit 115. The gate 116 is again opened when the key is released and the mantissa counter 112 and power counter 113 are allowed to count down to zero, at which point the ADSR control 118 again closes the gate 116 and this completes the operation cycle.

The digital tone generator 201 can be implemented as any one of a variety of digital systems such as that described in U.S. Pat. No. 4,085,644 entitled "Polyphonic Tone Synthesizer." The output data is obtained as a sequence of binary fixed point numbers.

The fast multiplier 200 is advantageously implemented as described in U.S. Pat. No. 4,031,377 entitled "Fast Multiplier Circuit Employing Shift Circuitry Responsive To Two Binary Numbers The Sum Of Which Approximately Equals The Mantissa Of The Multiplier" which is hereby incorporated by reference. This multiplier is characterized as a device which forms the product of a binary fixed point multiplicand and a binary floating point multiplier. These are the form of the digital data presented to the fast multiplier 200.

The utilization means 202 can comprise a digital to analog converter which transforms input digital data into analog musical waveshapes which can be used in conventional sound systems.

We claim:

1. A complementer apparatus for forming an output number in binary floating point number form having an output mantissa and output power corresponding to the complement of an input binary floating point number having an input mantissa and input power, comprising;
    power decode logic means responsive to power bits of said input binary floating point number for decoding power bits to a plurality of power signals wherein each power signal corresponding to the decimal equivalent of said power bits,
    power signal level means responsive to said power signals whereby a level signal is generated if said power signal corresponds to a decimal equivalent of said power bits less than a preselected decimal equivalent,
    power bit select means responsive to said level signal whereby the power bits of said output number are given preselected values if said level signal is generated,
    power bit generation means responsive to said level signal whereby if said level signal is not generated a power is created in binary form for said output number corresponding to the number of the most significant bits of said input mantissa having a unit binary value,
    first complement mantissa means responsive to said level signal whereby if said level signal is not generated an output mantissa is created for said output number corresponding to the position of a zero binary value in said input mantissa, and
    second complement mantissa means responsive to said level signal whereby if said level signal is generated an output mantissa is created for said output number responsive to said input mantissa and said input.

2. A complementer apparatus according to claim 1 utilized in an amplitude curve generator in an electronic musical instrument for controlling the amplitude values of a musical tone generated in response to actuating a key switch comprising;
    a multiple bit binary counter means including a low order section and a high order section wherein said low order section corresponds to the mantissa of a binary floating point number and said high order section corresponds to the power of said binary floating point number,
    means including a clock source for decrementing the count states of said multiple bit binary counter means when said key switch is activated,
    reset means responsive to actuation of said key switch whereby said multiple bit counter means is initially set at its maximum count state,
    binary data select means responsive to actuation and release of said key switch whereby complement of said binary floating point number is selected when key switch is actuated and said binary floating point number is selected when said key switch is released, and
    amplitude modulation means comprising a multiplier for controlling the amplitude values of said generated musical tone by multiplying said amplitude values by data selected by said binary data select means.

3. A complementer apparatus according to claim 1 wherein said input mantissa comprises four binary bits m1, m2, m3, and m4 and said input power comprises four binary bits p1, p2, p3, and p4; each of said binary bits having either a 1 or 0 value.

4. A complementer apparatus according to claim 3 wherein said power signal level means further comprises power logic circuitry whereby said level signal is generated if said binary bits p1, p2, p3, p4 all have a binary 1 value.

5. A complementer apparatus according to claim 3 wherein said power bit select means further comprises binary number generation circuitry responsive to the sequence of said binary bits p1 p2 p3 p4 whereby a binary number P1 P2 P3 P4 is generated having an equivalent decimal value of one less than the number of consecutive bits of binary value 1 in sequence of said binary bits and whereby said binary number P1 P2 P3 P4 is the power of said output number.

6. A complementer apparatus according to claim 3 wherein said first complement mantissa means further comprises;
    first mantissa logic circuitry for determining the position k of the first binary value 0 in the sequence of said binary bits m1 m2 m3 m4,
    binary complement circuitry responsive to said position k wherein a complemented sequence of binary bits is generated by complementing the last 5−k bits of said sequence of binary bits,
    first complement mantissa circuitry responsive to said complemented sequence of binary bits wherein a binary sequence of binary values M1 M2 M3 M4 is generated having said complemented sequence of binary bits as initial sequence values and the remainder of said binary sequence having a 1 binary value whereby said binary sequence M1 M2 M3 M4 is the mantissa of said output number.

7. A complementer apparatus according to claim 3 wherein said second complement mantissa means further comprises;
    second mantissa logic circuitry for forming a first sequence of length of one less than the negative decimal value of the power of said binary floating number wherein each element of said formed sequence has a binary value of 1,
    second complement mantissa circuitry for creating a second sequence of binary values that are the complement of said mantissa m1 m2 m3 m4, and
    combination circuitry whereby said second sequence is adjoined to said first sequence and the first four binary digits of said adjoined sequences M1 M2 M3 M4 is the mantissa of said output number.

8. In an electronic musical instrument wherein musical waveshape data is generated as a sequence of fixed point binary numbers having an amplitude generator for controlling the amplitudes of said waveshape date in response to the actuation and release of a keyswitch comprising;

a multiple bit binary counter means including a low order section and a high order section wherein the count state of said low order section corresponds to the mantissa of a floating point number and the count state of said high order section corresponds to the power of said binary floating point number, means including a timing clock source for decrementing said multiple bit binary counter means when said keyswitch is actuated, reset means responsive to actuation of said keyswitch whereby said multiple bit binary counter means is initially set at its maximum count state, power decode logic means responsive to power of said binary floating point number for decoding the binary numbers into a plurality of power signals, each power signal corresponds to a state of said high order section of said multiple bit binary counter means, power signal level means responsive to said power signals wherein a level signal is generated at a preselected count state of said multiple bit binary counter means, power bit select means responsive to said level signal wherein power bits of a complemented number are given preselected values if said level signal is generated, power bit generation means responsive to said level signal wherein if said level signal is not generated power bits of said complemented number are created in response to contents of said low order section of said multiple bit binary counter means, first complement mantissa means responsive to said level signal wherein if said level signal is not generated a mantissa is generated for said complemented number corresponding to contents of said low order section of said multiple bit binary counter means, second complement mantissa means whereby if said level signal is generated a mantissa is generated for said complemented number corresponding to the contents of said low order section and said high order section of said multiple bit binary counter means, a digital waveshape generator whereby a sequence of fixed point binary numbers representing consecutive points on a musical waveshape are created in response to actuation of said keyswitch, binary data select means responsive to actuation and release of said keyswitch whereby the mantissa and power of said complemented number are provided as an output binary floating point number when said keyswitch is actuated whereby the contents of said low order section is provided as the mantissa for said output binary floating point number and contents of said high order section is provided as power for said output binary floating point number in response to the release of said keyswitch, a multiplier means for forming a sequence of output numbers in binary fixed point form corresponding to the product of said output binary number and said sequence of fixed point binary numbers, and utilization means whereby said sequence of output numbers from said multiplier means are converted to audible musical tones.

* * * * *